H. J. McGEE.
SAND SPREADER.
APPLICATION FILED MAR. 13, 1916.

1,245,250.

Patented Nov. 6, 1917.

WITNESS
Frank H. Fowler

INVENTOR
Hugh J. McGee
BY
ATTORNEY

UNITED STATES PATENT OFFICE.

HUGH J. McGEE, OF SEATTLE, WASHINGTON.

SAND-SPREADER.

1,245,250.  Specification of Letters Patent.  Patented Nov. 6, 1917.

Application filed March 13, 1916. Serial No. 83,726.

*To all whom it may concern:*

Be it known that I, HUGH J. McGEE, a citizen of the United States, and a resident of Seattle, in the county of King and State of Washington, have invented certain new and useful Improvements in Sand-Spreaders, of which the following is a full, true, and exact specification.

My invention relates to improvements in sand spreaders and has for its principal object to provide an improved and novel form of sand spreader for use in connection with a vehicle, to provide a device of the above brief description which is removably attachable to a vehicle and which is driven by power furnished from the vehicle. In wet and slippery streets, it is desirable to sprinkle them with sand and on icy streets to sprinkle salt. To do this sprinkling requires considerable labor and time. My device sprinkles the sand or salt rapidly and evenly.

Figure 1:
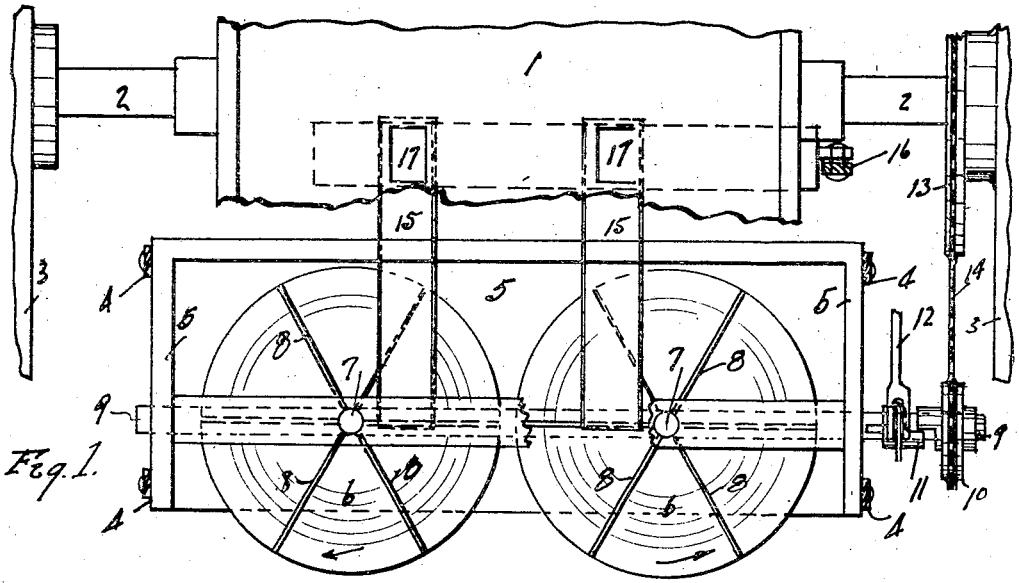
Figure 2:
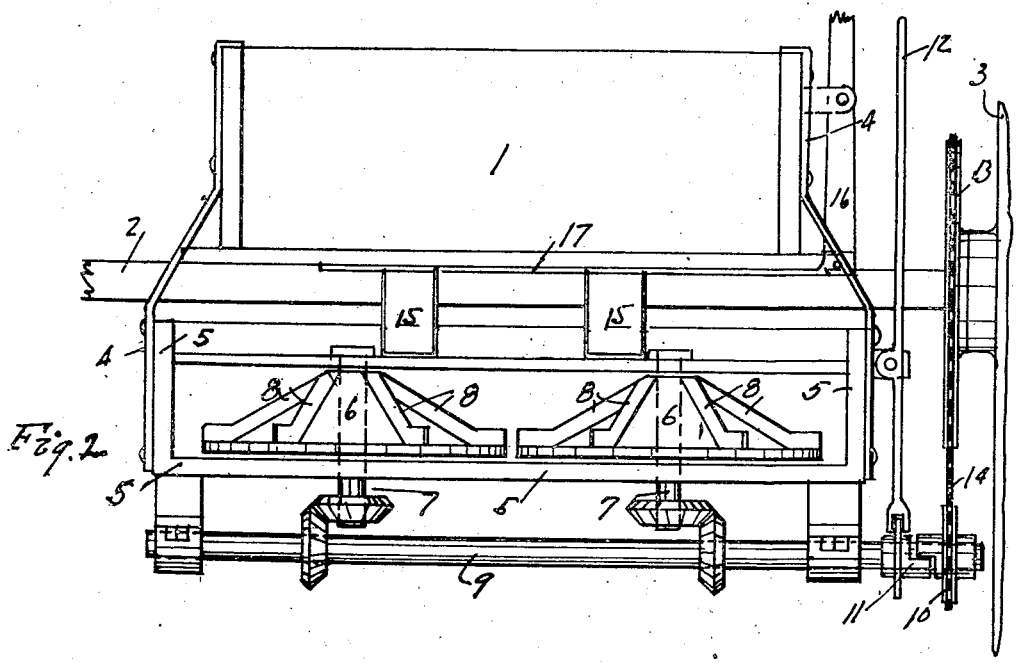

In the drawings, Figure 1 is a plan of my device shown attached to a fragment of a vehicle. Fig. 2 is a rear end elevation of same.

Referring more particularly to the drawings, numeral 1 indicates the hopper body of a vehicle which includes an axle 2 and traction wheels 3. My device is attachable beneath or adjacent the end of said hopper body by means of straps 4 or any other convenient means. The spreader proper includes a tray 5 closed at the bottom and on three sides. The open side is toward the rear of the vehicle. Rotary distributers 6 are mounted on vertical shafts 7 which pass through said tray. The distributers are cone shaped with horizontal bases and have radial ribs 8 on their outer surface. The shafts 7 are geared to a common counter shaft 9 which is mounted beneath the tray 5. The distributers are arranged to operate in the direction of the arrows on Fig. 1 so as to throw the sand outwardly. A clutch sprocket 10 is mounted loosely on shaft 9 and coöperates with a clutch 11 which is secured to shaft 11 and which is thrown into engagement by a hand lever 12. A sprocket 13 is secured to wheel 3 and is connected to sprocket 10 by a chain 14. As the wheel 3 revolves, the distributers 6 are set in rapid motion. Sand is supplied from body 1 through holes in the bottom thereof to chutes 15 which deposit the sand on the distributers near their centers and preferably toward the center of the device. The centrifugal force of the revolving distributers throws the sand, in an even film, outwardly to the sides and rear of the device. A hand lever 16 and slide 17 control the flow of sand to the distributers. My device has been found to give excellent results, to be cheap and economical, to operate in actual tests which extended over a considerable period of time.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is The combination of a vehicle including a body and wheels, a tray supported at the rear of the body, said tray being open at its top and rear end, braces between the body and the tray, chutes extending from the bottom of the body to a point above the tray to supply sand to the latter, a pair of vertical shafts extending through the bottom of the tray, a bar mounted across the top of the tray to form a support for the chutes and bearings for the vertical shafts, cone-shaped distributers fixed on the vertical shafts above the bottom of the tray, the bottoms of the distributers being parallel with and adjacent the bottom of the tray, a horizontal shaft below the tray, gears between the vertical shafts and the horizontal shafts to rotate the distributers in opposite directions, means between the horizontal shaft and one of the vertical wheels for rotating the former, and a clutch on the horizontal shaft for controlling the rotary motion of the distributers.

HUGH J. McGEE.